United States Patent [19]
Suhara et al.

[11] 4,327,010
[45] * Apr. 27, 1982

[54] SOLUTION OF FLUORINATED POLYMER HAVING CARBOXYLIC ACID SALT GROUPS

[75] Inventors: Manabu Suhara; Kiyotaka Arai, both of Yokohama, Japan

[73] Assignee: Asahi Glass Company, Ltd., Tokyo, Japan

[*] Notice: The portion of the term of this patent subsequent to Mar. 31, 1998, has been disclaimed.

[21] Appl. No.: 101,685

[22] Filed: Dec. 10, 1979

Related U.S. Application Data

[63] Continuation of Ser. No. 6,876, Jan. 25, 1979, Pat. No. 4,259,226.

[51] Int. Cl.³ .......................... C08K 5/05; C08L 27/14
[52] U.S. Cl. ..................................... 524/388; 524/391
[58] Field of Search .................. 260/33.4 F, 30.8 OS, 260/32.8 R, 32.6 R, 33.4 F; 521/38

[56] References Cited

U.S. PATENT DOCUMENTS

| | | | |
|---|---|---|---|
| 3,654,245 | 4/1972 | Kometani et al. | 526/240 |
| 4,053,445 | 10/1977 | Schulze | 260/32.8 R |
| 4,138,373 | 2/1979 | Ukihashi et al. | 521/38 |
| 4,259,226 | 3/1981 | Suhara et al. | 260/33.4 F |

*Primary Examiner*—William F. Hamrock
*Assistant Examiner*—Peter F. Kulkosky
*Attorney, Agent, or Firm*—Oblon, Fisher, Spivak, McClelland & Maier

[57] ABSTRACT

A solution of a fluorinated polymer having groups having the formula

—COOM wherein M represents an alkali metal atom or a metal atom in group II a or II b of the periodic table or ammonium group or an amine group in a highly polar organic solvent.

8 Claims, No Drawings

SOLUTION OF FLUORINATED POLYMER HAVING CARBOXYLIC ACID SALT GROUPS

This is a continuation of application Ser. No. 006,876, filed Jan. 25, 1979, now U.S. Pat. No. 4,259,226.

BACKGROUND OF THE INVENTION

FIELD OF THE INVENTION

The present invention relates to a solution of a fluorinated polymer. More particularly, it relates to a solution of a fluorinated polymer having carboxylic acid salt groups in a highly polar organic solvent.

DESCRIPTION OF THE INVENTION

Fluorinated polymers having carboxylic acid groups such as copolymers of a fluorinated olefin e.g. tetrafluoroethylene or hexafluoropropylene and a monomer having the formula

wherein X and Y respectively represents F or $C_1$–$C_{12}$ fluoroalkyl group; and A represents carboxylic acid group or a precursor thereof; l is 0 to 3, m is 0 or 1 and n is 1 to 12 have been used as cation exchange resins having excellent oxidation resistance, chlorine resistance, alkali resistance and heat resistance. These copolymers have been used as, for example, a membrane for an electrolysis for producing an alkali metal hydroxide and chlorine, a membrane for fuel cell and a membrane for dialysis.

If it is possible to obtain a solution of a fluorinated polymer having carboxylic acid groups, it is easy to fabricate a membrane by a simple process and to obtain a substrate having complicated shape or a membrane having thin thickness and to prepare a membrane impregnating said solution into a base and it is further possible to repair pin-holes in a membrane or to coat a substrate with said fluorinated polymer, advantageously.

However, a solubility of a fluorinated polymer having carboxylic acid groups has not been known and it has not been known to dissolve a fluorinated polymer having carboxylic acid groups.

Fluorinated polymers such as tetrafluoroethylene polymer tetrafluoroethylene/hexafluoropropylene copolymer and tetrafluoroethylene/perfluoro(alkylvinyl ether) copolymer are less soluble in comparison with hydrocarbon polymers and are insoluble in most of liquid media.

However, it has been known that certain fluorinated polymers having strong acidic groups such as sulfonic acid groups in a form of sulfamide or sulfonate groups may be dissolved in special polar organic solvents as disclosed in Japanese Patent Publication No. 13333/1973.

However, a fluorinated polymer having carboxylic acid groups are not soluble in the solvent for dissolving the fluorinated polymer having sulfonic acid groups, because carboxylic acid groups as side chains in the polymer chain impart different characteristics.

In the examples of Japanese Patent Publication No. 13333/1973, there is the disclosure that the copolymer of tetrafluoroethylene and perfluoro(3,6-dioxa-4-methyl-7-octenesulfonic acid) (17 mole % or 19 mole % of a content of the monomer having sulfonic acid group) in an acid from can be dissolved in n-butanol or dimethylacetamide.

However, corresponding fluorinated polymers having carboxylic acid groups instead of sulfonic acid groups could not be dissolved in these solvents.

SUMMARY OF THE INVENTION

It is an object of the present invention to provide a solution of a fluorinated polymer having carboxylic acid salt groups.

It is another object of the present invention to provide a process for preparing a solution by converting carboxylic acid groups of a fluorinated polymer having carboxylic acid groups in particle form into carboxylic acid salt groups and then, dissolving the modified fluorinated polymer in particle form in a specific solvent.

Foregoing objects of the present invention have been attained by providing a solution of a fluorinated polymer having groups having the formula

wherein M represents an alkali metal atom or a metal atom in group IIa or IIb of the periodic table or ammonium group or an amine group, in a highly polar organic solvent, especially a highly polar organic solvent having hydroxyl group.

DETAILED DESCRIPTION OF THE PREFERRED EMBODIMENTS

Various advantages of a solution of a fluorinated polymer can be attained by preparing the solution. However, in a practical purpose, it is important that the solvent used in the solution is easily available and easily removable from the solution. It is preferable that the solvent has a lower boiling point such as lower than 120° C. When a boiling point is high, a large energy is required for removing the solvent and the advantage of the solution is reduced.

In the present invention, a solvent having lower boiling point can be used whereby the advantages as the solution of a fluorinated polymer can be given without a trouble.

The solubility of the fluorinated polymer having carboxylic acid salt groups is depending upon an equivalent of carboxylic acid salt groups in the polymer. In order to give high solubility, an equivalent of carboxylic acid salt groups in the polymer (a gram of the polymer for one equivalent of carboxylic acid salt group) is usually less than 900 preferably less than 750.

The fluorinated polymer can be a homopolymer of fluorinated vinyl monomer having carboxylic acid group or a functional group convertible to carboxylic acid group or a copolymer of said fluorinated vinyl group and a fluorinated olefin.

The monomer having a functional group convertible to carboxylic group is used in a polymerization, the functional group in the polymer can be converted to carboxylic acid salt group by suitable process for the functional group.

The fluorinated polymers are preferably copolymers having the following units (I) and (II).

wherein X represents —F, —Cl, —H or —CF$_3$; X' is X or CF$_3$—(CF$_2$)$_{\overline{m}}$; m is an integer of 1 to 5; Y represents —(CF$_2$)$_{\overline{p}}$, —(O—CF$_2$)$_{\overline{p}}$, —(O—(CF$_2$—CFZ)$_{\overline{q}}$, —O—(CF$_2$—CFZ)$_{\overline{p}}$(O—CF$_2$—CFRf)$_{\overline{r}}$, —(CF$_2$)$_p$(CH$_2$)$_q$ or —O—(CF$_2$(CFZ—O—CF$_2$)$_{\overline{p}}$(CF$_2$)$_{\overline{q}}$(CF$_2$—O—CFRf)$_{\overline{r}}$; p, q and r respectively represent an integer of 1 to 10; Z and Rf respectively represent —F or a C$_1$-C$_{10}$ fluorinated alkyl group; A represents —COOH or a functional group convertible to —COOH by a hydrolysis, a neutralization or a reduction such as —CN, —COF, —COOR$_1$, —CONR$_2$R$_3$ or —CF$_2$—SO$_2$F; R$_1$ represents a C$_1$-C$_{10}$ alkyl group; M represents an alkali metal atom; a quaternary ammonium group; R$_2$ and R$_3$ respectively represent —H or a C$_1$-C$_{10}$ alkyl group.

In the copolymer having the units (I) and (II), a ratio of the units (II) to the units (I) is selected to give a content of the units (II) for the desired equivalent of carboxylic acid groups.

When a molecular weight of the polymer is shown by the temperature for a specific volumetric flow rate, methyl esters of the fluorinated polymers have usually 130° to 350° C. especially 160° to 300° C. as the temperature for 100 mm$^3$/sec. of the volumetric flow rate.

The polymer can incorporate one or more kinds of units formed from a monomer such as CF$_2$=CFORf, (Rf: a C$_1$-C$_{10}$ fluorinated alkyl group); CF$_2$=CF—CF=CF$_2$ or CF$_2$=CFO(CF$_2$)$_{1-4}$OCF=CF$_2$.

The fluorinated polymers having carboxylic acid groups are insoluble in most of solvents. However, the fluorinated polymers having carboxylic acid salt groups having the formula —COOM wherein M represents an alkali metal atom or a metal atom in Group IIa or IIb of the periodic table or ammonium group or an amine group can be soluble in a highly polar organic solvent.

In many cases, the fluorinated polymers having carboxylic acid ester groups or free carboxylic acid groups can be produced.

As described in the following examples, these fluorinated polymers are insoluble in solvents. Accordingly, these polymers are contacted with an alkali metal or ammonium hydroxide, an alkali metal or ammonium carbonate or an alkylamine to react the carboxylic acid ester groups or free carboxylic acid groups with it to convert into the groups having the formula

—COOM.

The alkali metal atom is preferably Li, Na and K and the metal atom in Group IIa or IIb of the periodic table is preferably Mg and Ca and the amine is preferably a monovalent amine such as methylamine, dimethylamine and diethanolamine.

The fluorinated polymer having carboxylic acid salt groups having —COOM wherein M is an alkali metal atom is especially preferable.

The fluorinated polymer having groups of —COOLi has especially higher solubility in comparison with the fluorinated polymer having groups of —COONa whereby a solution having high concentration of the fluorinated polymer can be obtained.

The organic solvents used for dissolving the fluorinated polymer are solvent having high polarity i.e. large dipolar moment and function for bonding to protons.

The solvents are miscible at least 5 wt.% preferably 50 wt.% in water and mostly miscible in water in any ratio.

The organic solvents having hydroxyl group such as monoalcohols, polyhydric alcohols, cellosolve etc. are especially preferable since they impart excellent solubility.

Suitable organic solvents include a C$_1$-C$_4$ alcohols such as methanol, ethanol, n- or iso-propanols and n-, iso- or tert-butanols; polyhydric alcohols such as ethyleneglycol and propyleneglycol and cellosolves.

In the present invention, it is also possible to use the other polar organic solvents such as organic amides e.g. dimethylformamide and dimethylacetamide; and dimethylsulfoxide, acetone or hexafluoroacetone.

The organic solvents used in the present invention having a boiling point lower than 120° C. can be easily removed from the solution.

When the fluorinated polymer is dissolved in said organic solvent, a desired amount of the fluorinated polymer is added to the solvent and is dissolved by suitable means for promoting the dissolution such as stirring. The shape of the fluorinated polymer is not critical, but it is preferably particles having a size passing through 20 mesh sieve.

The temperature in the dissolution is preferably higher temperature for promote the dissolution and usually in a range of 25° to 150° C. In order to promote the dissolution, the dissolution can be carried out under an elevated pressure such as 1 to 10 atm. A solution having 0.1 to 50 wt.% of a concentration of the fluorinated polymer can be easily obtained.

The solution of the fluorinated polymer having carboxylic acid salt groups can be used in various fields as described above, and especially preferable to prepare films having a desirable shape used for an electrolysis, a dialysis or a fuel cell by casting the solution or impregnating the solution into a porous substrate made of asbestos or polytetrafluoroethylene.

These film can be also effectively used for repairing a defect such as pin-holes.

The solution is also preferably used for a surface coating of a spacer net.

The present invention will be further illustrated by certain examples and references which are provided for purposes of illustration only and are not intended to be limiting the present invention.

EXAMPLE 1

A bulk polymerization of tetrafluoroethylene and methyl perfluoro-5-oxo-6-heptenoate was carried out in the presence of azobisisobutyronitrile to obtain a powdery copolymer having 666 of an equivalent of carboxylic acid groups. The copolymer was added to 1 N aqueous solution of lithium hydroxide and it was treated at 90° C. for 16 hours and then, washed with deionized water.

The kind of carboxylic acid salt groups of the resulting copolymer was examined by infrared spectrum. It was found that all of carboxylic acid groups were converted to carboxylic acid lithium salt groups.

The fluorinated copolymer was added to 99.5% methanol at 60° C. to dissolve all of the copolymer whereby a transparent viscous solution having 1.3 wt.% of a concentration was obtained.

The solution of the copolymer was casted and dried in air to obtain a film having about 10μ of a thickness. The cast film was easily separated from a mold by dipping it in 1 N-HCl. It was found by infrared spectrum that the carboxylic acid salt groups of the film was converted to carboxylic acid groups.

EXAMPLES 2 TO 12

The fluorinated copolymers having the same formula with that of Example 1 except varying an equivalent of carboxylic acid groups, were used and treated in each aqueous solution of lithium hydroxide, sodium hydroxide, potassium hydroxide, calcium hydroxide, magnesium hydroxide, ammonia, diethanolamine or dimethylamine by immersing each copolymer to convert carboxylic acid groups of the copolymer to carboxylic acid salt groups shown in Table 1. 10 g of each dried fluorinated copolymer was dissolved in 1 liter of each organic solvent shown in Table 1 to obtain each transparent viscous solution. Solubilities of the fluorinated copolymers are shown in Table 1. The solubilities are shown by weight percents of the dissolved fluorinated polymer.

TABLE 1

| Exp. | Equi. of COOM | Kind of salt of COOM | Organic solvent | Condition in dissolution (°C. × hour) | Solubility (%) |
|---|---|---|---|---|---|
| 2 | 500 | Li | Cellosolve | 120 × 16 | 35 |
| 3 | 680 | Na | Propyleneglycol | 90 × 16 | 54 |
| 4 | 680 | Na | Methanol | 60 × 16 | 44 |
| 5 | 720 | Li | Methanol | 60 × 16 | 100 |
| 6 | 680 | K | Methanol | 60 × 16 | 32 |
| 7 | 500 | Ca | Methanol | 60 × 64 | 8 |
| 8 | 500 | Mg | Propyleneglycol | 180 × 64 | 15 |
| 9 | 500 | Ca | Glycerin | 200 × 64 | 25 |
| 10 | 600 | NH4 | Methanol | 60 × 16 | 42 |
| 11 | 680 | diethanol amine | Ethanol | 80 × 16 | 28 |
| 12 | 690 | dimethyl amine | Methanol | 60 × 16 | 38 |

EXAMPLE 13

In accordance with the process of Example 1 except using tetrafluoroethylene and methyl perfluoro (5,8-dioxo-7-methyl-g-decenoate)

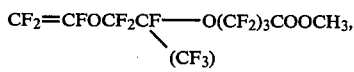

each bulk copolymerizations was carried out to obtain copolymers having each equivalent of carboxylic acid groups shown in Table 2 and the resulting copolymers were treated to convert carboxylic acid groups to carboxylic acid salt groups shown in Table 2 and 10 g of each powdery fluorinated copolymer was dissolved in methanol to examine the solubilities.

TABLE 2

| Equi. of —COOM | Kind of salt of —COOM | Organic solvent | Condition of dissolution (°C. × hour) | Solubility (%) |
|---|---|---|---|---|
| 650 | Li | Methanol | 60 × 16 | 100 |
| 650 | Na | Methanol | 60 × 16 | 75 |
| 800 | Li | Methanol | 60 × 16 | 18 |

EXAMPLE 14

In accordance with the process of Example 13 except using tetrafluoroethylene and methyl perfluoro-3-oxo-4-pentonoate $CF_2=CFOCF_2COOCH_3$, the tests of Example 13 were carried out. The polymers and condition and the results are shown in Table 3.

TABLE 3

| Equi. of —COOM | Kind of salt of —COOM | Organic solvent | Condition of dissolution (°C. × hour) | Solubility (%) |
|---|---|---|---|---|
| 450 | Na | Methanol | 60 × 16 | 100 |
| 670 | Li | Methanol | 60 × 16 | 100 |

EXAMPLE 15

The solution of the fluorinated polymer obtained in Example 1 was concentrated by an evaporator to about 10% of a concentration and a viscous solution was obtained.

The viscous solution was casted in a mold and dried in air to obtain a membrane having about 100μ of a thickness. The membrane was easily separated from the mold by immersing it in 1 N-HCl.

In a two compartment type cell using the resulting membrane, an electrolysis of an aqueous solution of sodium chloride was carried out. As the result, a current efficiency was 95% in 35 wt.% of a concentration of a catholyte.

EXAMPLE 16

A porous membrane of polytetrafluoroethylene (Fluoropore) was immersed into the solution of the fluorinated copolymer of Example 1 and taken up and dried in air to obtain an impregnated membrane. The resulting membrane was treated in 1 N-HCl.

In a two compartment type cell using the membrane as a cation exchange membrane, an electrolysis of an aqueous solution of sodium chloride was carried out. As the result, a current efficiency was 96% in 35 wt.% of a concentration of a catholyte.

EXAMPLE 17

A net (60 mesh) made of a fiber of a copolymer of tetrafluoroethylene and ethylene (Aflon COP manufactured by Asahi Glass) was immersed into 10% solution of the fluorinated polymer obtained in Example 15 and taken up and dried on a glass plate and the membrane was treated with 1 N-HCl.

In a two compartment type cell using the resulting membrane as a cation exchange membrane, an electrolysis of an aqueous solution of sodium chloride was carried out. As the result, a current efficiency was 97% in 40% of a concentration of a catholyte.

EXAMPLE 18

In accordance with the process of Example 17 except using a net of polytetrafluoroethylene (Toyoflon manufactured by Toray) instead of Aflon COP, the casted membrane having the supporter was prepared and treated in 1 N-HCl and an electrolysis of an aqueous solution of sodium chloride was carried out by using the membrane. As the result, a current efficiency was 96% in 35% of a concentration of a catholyte.

What is claimed is:

1. A solution of a fluorinated polymer which is selected from the group consisting of a homopolymer of a fluorinated vinyl monomer having a carboxylic acid group or a functional group convertible into a carboxylic acid group, and a copolymer of said fluorinated vinyl monomer with a fluorinated olefin, wherein said flourinated polymer has less than 900 of an equivalent of carboxylic acid groups having the formula:

—COOM wherein M represents an alkaline metal atom or a metal atom in group IIa or IIb of the Periodic Table or an ammonium group or an amine group, in a highly polar organic solvent having a hydroxyl group.

2. The solution of claim 1 wherein the organic solvent has a boiling point lower than 120° C.

3. The solution of claim 1 wherein the organic solvent is a $C_1$-$C_4$ alcohol or glycol.

4. The solution of claim 1 which has 0.1 to 50 weight % of concentration of fluorinated polymer.

5. A solution of a fluorinated copolymer of units of formula (I):

$$-(CX_2-CXX')- \qquad (I)$$

with units of formula II:

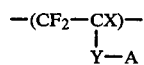  (II)

wherein
X is selected from the group consisting of F, Cl, H, $CF_3$:
X' is X or $CF_3-(CF_2)-_m$, m being an integer of 1 to 5;
Y is selected from the group consisting of $-(CF_2)-_p$, $-O-(CF_2)-_p$, $-(OCF_2-CFZ)_q-$, $-(OCF_2-CFZ)_p-O-CF_2-CFR_f)_q-$, $-(CF_2)_p-(CH_2)-_q$ and $-OCF_2-(CFZ-O-CF_2-)_p-(CF_2)_q-(CF_2OCFR_f)_r-$ wherein p, q and r, respectively, represent an integer from 1 to 10; Z and $R_f$, respectively, represent —F or a $C_{1-10}$ fluorinated alkyl group;

A is selected from the group consisting of —COOH, and a functional group convertible into a COOH group, which is selected from the group consisting of CN, COF, $COR^1$, $CONR^2R^3$, and $CF_2$-$SO_2F$, where $R^1$ represents a $C_{1-10}$ alkyl group; and $R^2$, $R^3$, respectively, represent H or $C_{1-10}$ alkyl group;

wherein the ratio of units (II) to units (I) is such that said copolymer has less than 900 of an equivalent value of carboxylic acid groups having the formula:

—COOM wherein M represents an alkaline metal atom or a metal atom in group IIa or IIb of the periodic table or an ammonium group or an amine group, in a highly polar organic solvent having a hydroxy group.

6. The solution of claim 5 wherein said organic solvent has a boiling point lower than 120° C.

7. The solution of claim 5 wherein the organic solvent is a $C_1$-$C_4$ alcohol or glycol.

8. The solution of claim 5 which has 0.5 to 50 weight % of a concentration of the fluorinated polymer.

* * * * *

UNITED STATES PATENT AND TRADEMARK OFFICE
CERTIFICATE OF CORRECTION

PATENT NO. : 4,327,010
DATED : Apr. 27, 1982
INVENTOR(S) : Manabu, Suhara et. al.

It is certified that error appears in the above—identified patent and that said Letters Patent is hereby corrected as shown below:

On the title page,
Please correct Priority Data as follows:

[30] -- Foreign Application Priority Data
   Feb. 14, 1978 [JP] Japan ........ 14958/78 --

Signed and Sealed this

Twenty-fourth Day of August 1982

[SEAL]

Attest:

GERALD J. MOSSINGHOFF

Attesting Officer   Commissioner of Patents and Trademarks